(12) United States Patent
Mundt et al.

(10) Patent No.: US 7,400,499 B2
(45) Date of Patent: Jul. 15, 2008

(54) SYSTEM AND METHOD FOR MECHANICALLY FASTENED INFORMATION HANDLING SYSTEM FOOT

(75) Inventors: Kevin Mundt, Austin, TX (US); Patrick V. Illingworth, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 380 days.

(21) Appl. No.: 11/342,156

(22) Filed: Jan. 27, 2006

(65) Prior Publication Data

US 2007/0177342 A1    Aug. 2, 2007

(51) Int. Cl.
*G06F 1/16* (2006.01)

(52) U.S. Cl. ................... 361/683; 345/156; 248/346.01; 359/461

(58) Field of Classification Search ............ 248/56, 248/127, 346.01, 442.1; 359/434, 461; 438/31; 345/156, 158; 361/679–687, 724–727
See application file for complete search history.

(56) References Cited

U.S. PATENT DOCUMENTS

| 6,059,384 | A | 5/2000 | Ho ........................ 312/223.2 |
| 6,098,952 | A | 8/2000 | Tonn ......................... 248/688 |
| 6,497,013 | B1 * | 12/2002 | Goto et al. ............. 248/346.01 |
| 6,555,747 | B2 | 4/2003 | Chen et al. ................. 174/52.1 |
| 7,079,383 | B2 * | 7/2006 | Homer ...................... 361/686 |
| 2006/0198092 | A1 * | 9/2006 | Searby ....................... 361/683 |

* cited by examiner

*Primary Examiner*—Hung V Duong
(74) *Attorney, Agent, or Firm*—Hamilton & Terrile, LLP; Robert W. Holland

(57) ABSTRACT

A support foot is mechanically fastened to an information handling system chassis with a coupling device partially embedded in the support foot through injection molding of the support foot over the coupling device. For instance the coupling device is a staple made of ductile metal having a body embedded in the support foot and two legs extending outward towards the chassis side of the support foot. The legs insert in openings at a chassis attachment point and bend to secure the support foot to the chassis. For instance, the staple legs are formed from a ductile metal, such as brass, aluminum or steel, that is bent by hand or by a machine to a closed staple shape.

20 Claims, 5 Drawing Sheets

SYSTEM AND METHOD FOR MECHANICALLY FASTENED INFORMATION HANDLING SYSTEM FOOT

BACKGROUND OF THE INVENTION

1. Field of the Invention

The present invention relates in general to the field of information handling system supports, and more particularly to a system and method for a mechanically fastened information handling system foot.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often used in an office environment, typically on and around office furniture. Generally, information handling systems are equipped with rubber support feet that limit the risk of damage to furniture on which a system rests and also help to dampen vibration noises. With desktop and tower information handling systems, adequate chassis size usually exists to allow mechanical fastening of rubber support feet. Larger chassis volumes allow mechanical devices, such as bolts and screws, to protrude relatively far into the system without interfering with system operations. Desktop and tower information handling systems generally are setup at a fixed location and only rarely moved, subjecting their rubber support feet to only infrequent friction or other forces. Thus, end users do not typically have problems with failure of desktop and tower information handling system rubber support feet. Even if problems do arise, only a minimal impact is generally felt by the end user since these systems are typically not mobile.

In contrast to desktop and tower information handling systems, portable information handling systems, often referred to as notebooks, have small chassis sizes to aid end user mobility. The smaller chassis size of portable information handling systems typically prevents mechanical attachment of rubber support feet. Instead, rubber support feet are generally adhered to the lower outer surface of portable information handling systems with an adhesive. Unfortunately, rubber support feet are made from a compliant, flexible material, such as molded from plastic with silicone used as a material component. Adhesives typically do not bond well to silicone material, making the rubber support feet vulnerable to failure. Failure is sometimes induced under normal operating conditions for portable information handling systems when a portable system resting on its rubber support feet is slid across a surface, such as a desk. The sliding force tends to roll and peel away the rubber support foot from the surface of the chassis because the compliant rubber support foot material is sandwiched between the rigid notebook surface and the rigid work surface. If a rubber support foot falls off a portable information handling system, the system tends to become awkward to use and often results in a request for customer service from the manufacturer of the portable information handling system to reaffix the support foot.

SUMMARY OF THE INVENTION

Therefore a need has arisen for a system and method which securely attaches a support foot to an information handling system chassis with minimal intrusion into the chassis.

In accordance with the present invention, a system and method are provided which substantially reduce the disadvantages and problems associated with previous methods and systems for attaching a support foot to an information handling system chassis. A ductile coupling device embedded in support foot material is bent at a chassis attachment point to couple a support foot to an information handling system chassis.

More specifically, an information handling system has plural processing components disposed in a chassis to process and present information to an end user. The information handling system chassis has plural support feet to support the chassis on a work surface. The support feet are constructed of support material, such as molded soft plastic having silicone, that protects the work surface from damage, dampens noises and resists sliding of the chassis across the work surface. To prevent separation of the support feet from the chassis by introduction of lateral sliding forces, each support foot is coupled to the chassis with a partially embedded metallic coupling device, such as a staple made from a ductile metal, like brass, aluminum or low carbon steel. The staple has a body that is embedded in support material during molding of the support material and two legs that extend toward the chassis side of the support foot. The legs are inserted in openings at an attachment point of the chassis and bent at the chassis to secure the chassis side of the support material against the chassis. The support feet are fabricated with insert molding of support material over plural interconnected staples. The interconnect is sheared to separate individual support feet for installation into an information handling system chassis. Automated installation can be provided by a stapler that shears the interconnect and then bends the staple legs at the chassis.

The present invention provides a number of important technical advantages. One example of an important technical advantage is that support feet are mechanically fastened to an information handling system chassis. Mechanically fastened support feet are less likely to separate from the chassis and thus reduce the likelihood of end user support requests related to support foot failure. Mechanical fastening with ductile fasteners consumes little room within the chassis interior and the fasteners firmly attach with relatively small mechanical manipulation. Injection molding of dampening material over the mechanical fasteners provides rapid and inexpensive manufacture of the foot supports.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Mechanically fastening support feet to an information handling system chassis with ductile staples embedded in each support foot provides secure coupling with minimal footprint within the chassis. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
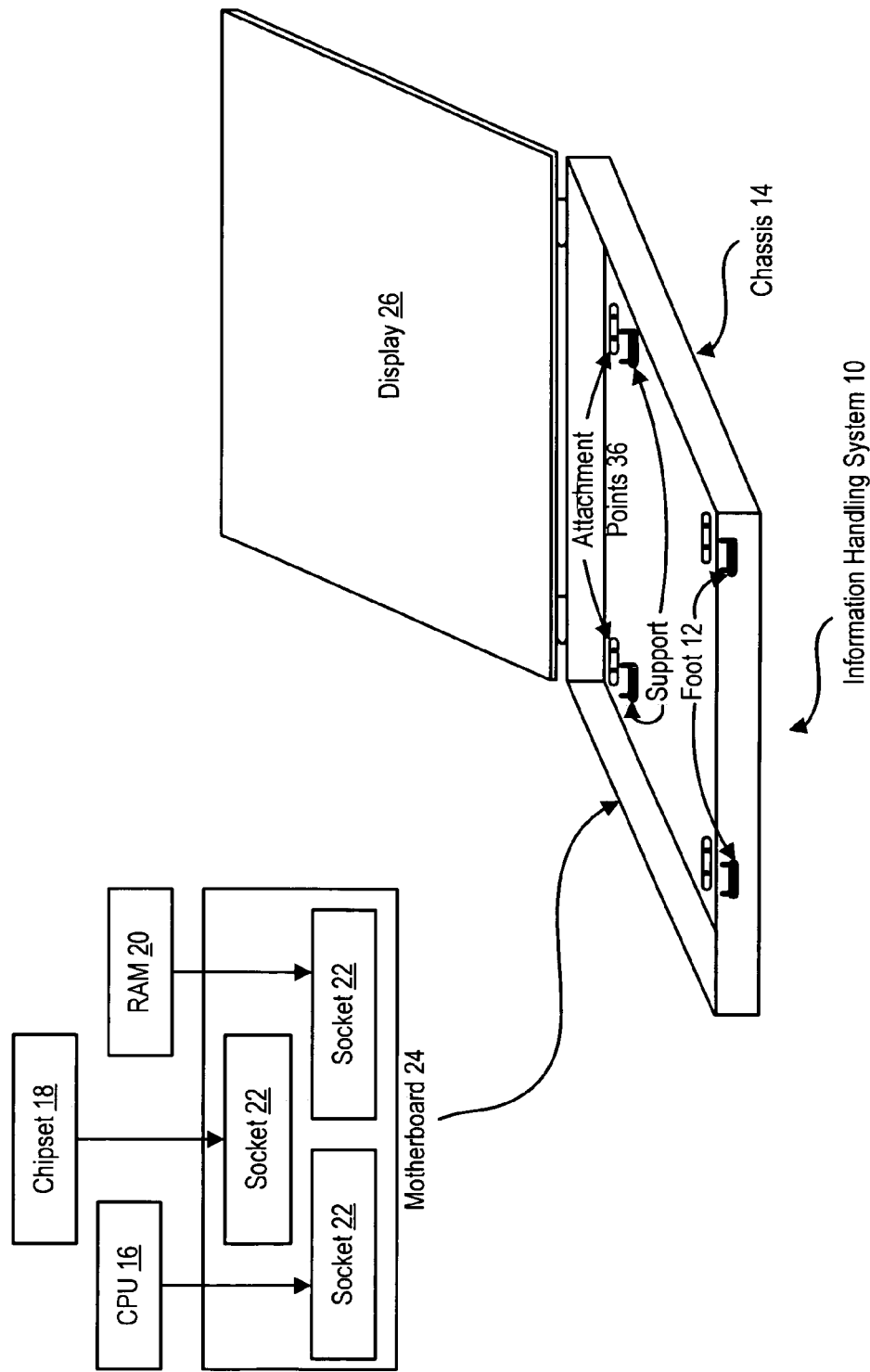
FIG. 1 depicts a blown-up view of a portable information handling system having support feet aligned to couple to the system chassis.

Referring now to FIG. 1, a blown-up view depicts a portable information handling system 10 having support feet 12 aligned to couple to the system chassis 14. Portable information handling system 10 has plural processing components for processing information, such as a CPU 16, chipset 18 and RAM 20 inserted in sockets 22 of a motherboard 24. Motherboard 24 assembles in chassis 14 and communicates visual information for presentation on an integrated display 26. Portable information handling systems also typically include a variety of subsystems that support independent operation, such as an internal battery to power the processing components, a wireless networking card for communication and permanent storage devices like a hard disk drive and optical drive. During normal usage, portable information handling system 10 rests on support feet 12, which as subjected to lateral forces if the system is slid across a work surface. Support feet 12 are rubber-like parts molded from soft plastic with silicone or polyurethane to cushion the system and reduce inadvertent sliding on a work surface. As is explained in greater detail below, support feet 12 are mechanically fastened to chassis 14 with ductile fastening devices that are embedded in the molded plastic. Mechanical fastening couples support feet 12 securely to chassis 14 to prevent separation due to lateral forces.

Figure 2:
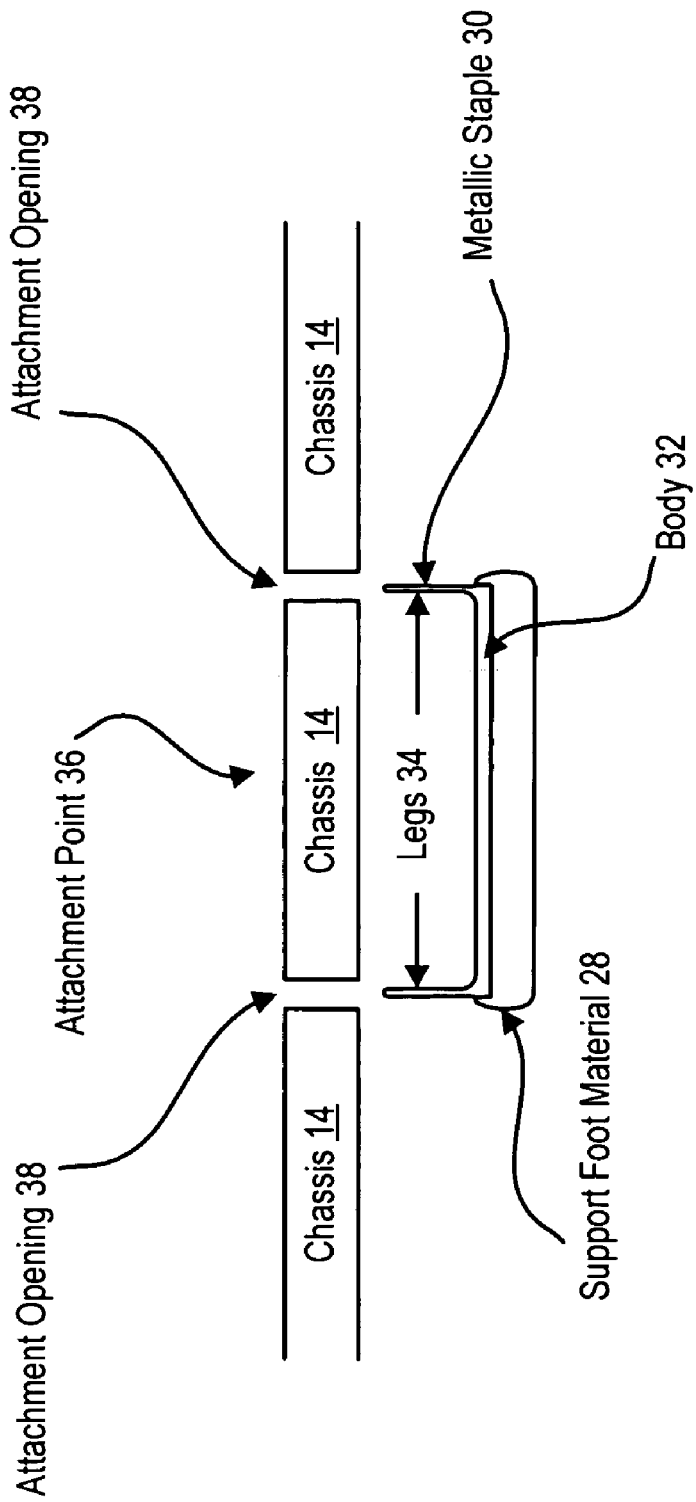
FIG. 2 depicts a side view of a support foot aligned to couple to an information handling system chassis.
Figure 3:
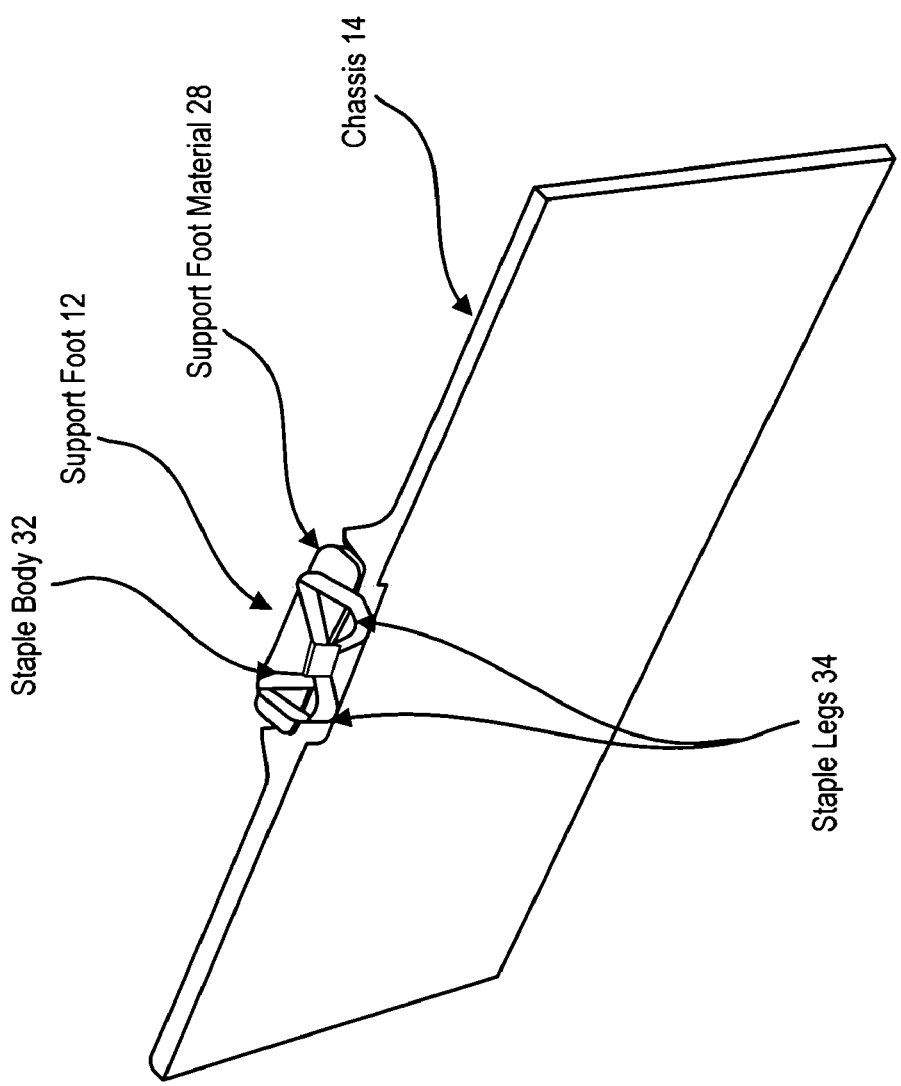
FIG. 3 depicts a side view of a support foot coupled to an information handling system chassis.
Figure 4:
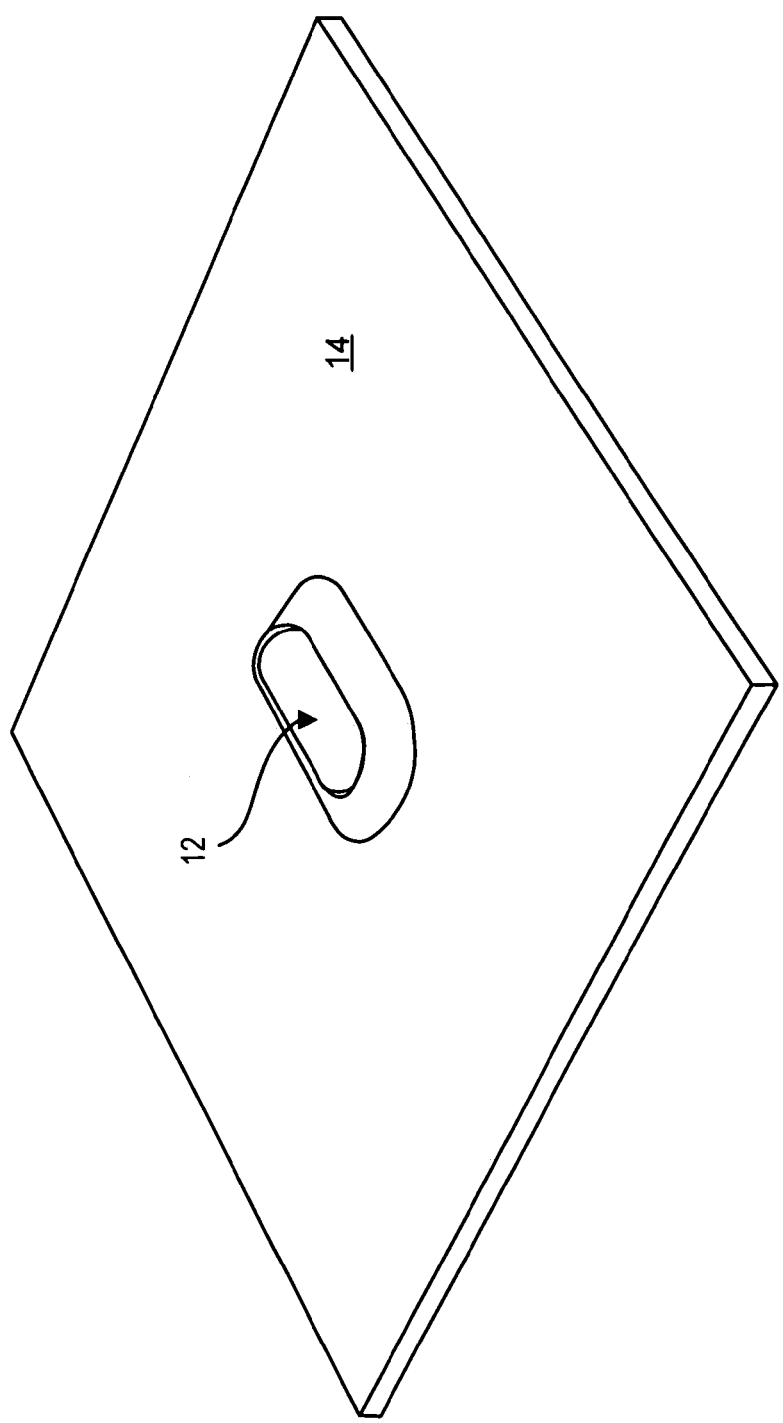
FIG. 4 depicts the outer surface of an information handling system chassis having a support foot installed.

Referring now to FIG. 2, a side view depicts a support foot 12 aligned to couple to an information handling system chassis 14. Support foot 12 is built from support foot material 28, such as plastic molded with silicone or polyurethane to have a compliant nature, and a ductile coupling device, such as a metallic staple 30. Metallic staple 30 is formed in a C shape like a conventional staple having a body portion 32 and leg portions 34. Body portion 32 is embedded in support foot material 28 to prevent physical separation of body 32 from support foot material 28. Leg portions 34 extend outward from support foot material 28 at the chassis side of support foot material 28. Leg portions 34 align at an attachment point 36 with attachment openings 38 to couple to chassis 14. Each leg portion 34 is inserted in an opening 38 and then bent to securely attach support 12 to chassis 14. FIG. 3 depicts a side view of a support foot 12 coupled to an information handling system chassis 14. Staple leg portions 34 are bent to secure the support foot material 28 chassis side against chassis 14 so that sliding of the opposing work surface side against a work surface will not lead to separation of the support material from staple body 32. The bent staple legs 34 have minimal footprint within chassis 14 to avoid interference with the layout design of internal components. FIG. 4 depicts the outer surface of an information handling system chassis 14 having a support foot 12 installed with the work surface side exposed. The embedded staple is not exposed to avoid risk of damage by a metallic surface against a work surface. Staple legs 34 are bent during manual installation or may be automatically installed with a stapler device.

Figure 5:
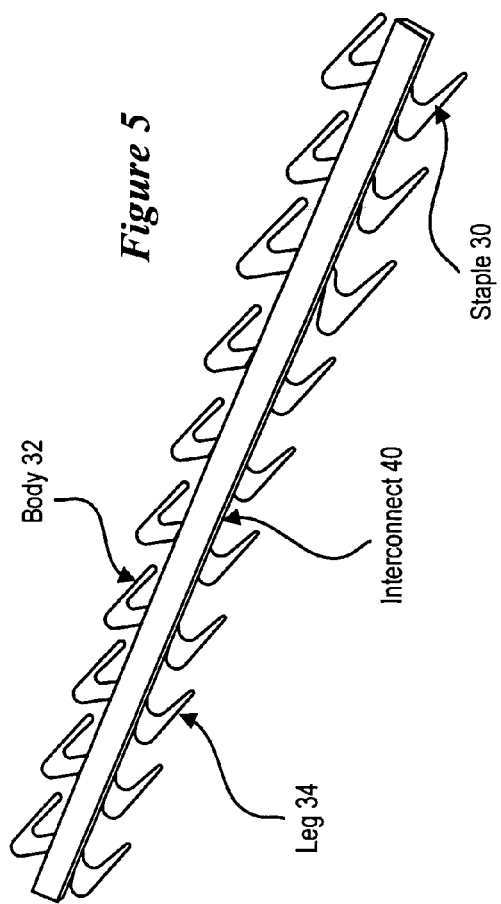
FIG. 5 depicts a plurality of interconnected metallic coupling devices before injection molding of the support foot material.
Figure 6:
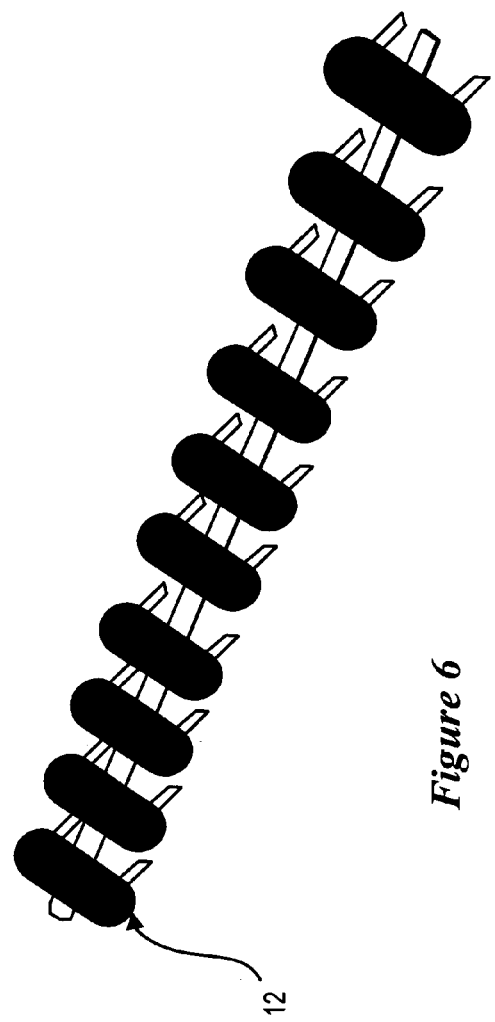
FIG. 6 depicts plural interconnected support feet configured for coupling to an information handling system.

Referring now to FIG. 5, a plurality of interconnected metallic coupling devices are depicted before injection molding of the support foot material. Each staple 30 has a body 32 that is embedded in support foot material and two legs 34 that extend from the support foot material to attach to an information handling system chassis. An interconnect 40 connects plural staples 30 to each other for easier handling during manufacture. For instance, staples 30 and interconnect 40 are made of the same metallic material, such as brass, aluminum or steel, and sized to fit in a mold for plastic insert injection or cast molding. FIG. 6 depicts a plurality of support feet 12 molded onto the interconnected staples depicted by FIG. 5. After manufacture of interconnected support feet 12, individual support feet are sheared from interconnect 40 and coupled to an information handling system chassis. In one embodiment, an automated stapler accepts plural interconnected support feet and automatically shears individual support feet free from interconnect 40 at installation in an information handling system chassis. For instance, a stapler performs a two step attachment by first shearing interconnect 40 and then bending legs 34 at a chassis to install the support foot.

Although the present invention has been described in detail, it should be understood that various changes, substitutions and alterations can be made hereto without departing from the spirit and scope of the invention as defined by the appended claims.

What is claimed is:

1. An information handling system comprising:

a chassis sized to contain processing components that process information, the chassis having one or more support foot openings;

plural processing components disposed in the chassis and operable to process information; and at least one support foot coupled to the chassis through the support foot opening, the support foot having a ductile metal coupling device partially embedded in a support material, the ductile metal coupling device bent at the support foot opening to couple to the chassis.

2. The information handling system of claim 1 wherein the ductile metal coupling comprises brass.

3. The information handling system of claim 1 wherein the ductile metal coupling device comprises a staple shaped device having two legs and a body, the body embedded in the support material, the legs bending inward towards the body to couple to the chassis.

4. The information handling system of claim 3 wherein the support material comprises compliant plastic injection molded around the body.

5. The information handling system of claim 4 wherein the support material further comprises silicone.

6. An information handling system support foot comprising:
   support material having a chassis side sized to couple against an information handling system chassis and an opposing support side shaped to rest on a work surface; and
   a ductile coupling device partially embedded in the support material and having one or more legs extending outward from the support material towards the chassis side, the legs operable to bend around an attachment point of an information handling system chassis to couple the support material to the chassis.

7. The information handling system support foot of claim 6 wherein the ductile coupling device comprises metal formed in a staple shape having a body and two legs, the body embedded in the support material, the legs folding into the chassis side of the support material in a staple pattern.

8. The information handling system of claim 7 wherein the metal comprises steel.

9. The information handling system of claim 7 wherein the support material comprises cast plastic having silicone.

10. A method for coupling a support foot to an information handling system chassis, the method comprising:
    embedding a coupling device in the support foot, the support foot having a support side and a chassis side, the coupling device having at least one leg extending outward towards the chassis side;
    inserting each leg into an opening of the chassis so that the chassis side of the support foot rests proximate the chassis; and
    bending each leg at the chassis opening to secure the chassis side of the support foot against the chassis.

11. The method of claim 10 wherein inserting each leg into an opening of the chassis further comprises inserting first and second legs into first and second openings.

12. The method of claim 11 wherein bending further comprises bending the first and second legs to form a closed staple shape that secures the chassis side of the support foot against the chassis.

13. The method of claim 10 wherein embedding a coupling device further comprises injection molding the support foot about the coupling device.

14. The method of claim 13 wherein the coupling device comprises a metal staple having a body and two legs, the body injection molded in the support foot, the legs extending out from the chassis side of the support foot.

15. The method of claim 14 wherein the staple comprises aluminum.

16. A method for manufacture of information handling system chassis support feet, the method comprising:
    forming plural interconnected staples, each staple having a body and at least two ductile legs; and
    molding a support foot around each staple body, the support foot have a support surface and a chassis surface, the ductile legs extending past the chassis surface and operable to bend back towards the chassis surface around a chassis attachment point to couple the support foot chassis surface against the chassis.

17. The method of claim 16 wherein molding a support foot further comprises injection molding compliant plastic around each staple body.

18. The method of claim 16 wherein the staples comprise low carbon steel.

19. The method of claim 16 further comprising:
    inserting the legs through chassis openings; and
    bending the legs at the chassis openings to secure the support foot against the chassis.

20. The method of claim 19 wherein the chassis comprises a portable information handling system chassis.

* * * * *